United States Patent
Härzschel et al.

(10) Patent No.: US 6,552,120 B1
(45) Date of Patent: Apr. 22, 2003

(54) USE OF VINYLAROMATIC/1,3-DIENE COPOLYMERS STABILIZED WITH PROTECTIVE COLLOIDS IN BUILDING ADHESIVE FORMULATIONS

(75) Inventors: Reinhard Härzschel, Burghausen (DE); Theo Mayer, Julbach (DE); Hans-Peter Weitzel, Reischach (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/831,593

(22) PCT Filed: Oct. 14, 1999

(86) PCT No.: PCT/EP99/07714

§ 371 (c)(1), (2), (4) Date: May 11, 2001

(87) PCT Pub. No.: WO00/30992

PCT Pub. Date: Jun. 2, 2000

(30) Foreign Application Priority Data

Nov. 19, 1998 (DE) ................................ 198 53 489

(51) Int. Cl.$^7$ ................................ C08J 5/10; C08L 3/00
(52) U.S. Cl. ................ 524/734; 524/724; 524/732; 524/733; 524/714; 524/723; 524/729; 524/700
(58) Field of Search ................ 700/700, 714, 700/723, 724, 729, 732, 733, 734, 773

(56) References Cited

FOREIGN PATENT DOCUMENTS

| DE | 2148456 | 4/1973 |
|---|---|---|
| DE | 19710380 | 9/1998 |
| EP | 0182628 | 8/1989 |
| EP | 0671420 | 9/1995 |
| EP | 0722917 | 7/1996 |
| EP | 0723975 | 7/1996 |
| GB | 1407827 | 9/1975 |
| WO | 9738042 | 10/1997 |
| WO | 99/16794 | 4/1999 |

OTHER PUBLICATIONS

Derwent Abstract corresponding to EP 722917 [AN 1996—335409].
Derwent Abstract corresponding to WO 97/38042 [An 1997—512672].
Derwent Abstract corresponding to DE 19710380 [AN 1997—512672].
Derwent Abstract corresponding to WO 99/16794 [AN 1999—255060].
Fox T.G., Bull. Am. Physics Co., 1, 3, p. 123 (1956).
Polymer Handbook, 2nd Ed., J. Wiley & Sons, New York (1975).
Derwit Abstract corresponding to EP 671420 [AN 1995—312745].

Primary Examiner—Nathan M. Nutter
Assistant Examiner—U. K Rajguru
(74) Attorney, Agent, or Firm—Brooks & Kushman P.C.

(57) ABSTRACT

The invention relates to the utilization of aqueous polymer dispersions or of polymer powders which can be redispersed in water and which are based on protective colloid-stabilized aromatic vinyl-1,3-diene-copolymers in adhesive formulations used in the building industry, whereby the polymer dispersion and the polymer powders are produced by emulsion polymerization of a mixture containing at least one aromatic vinyl and at least one 1,3-diene in the presence of one or more protective colloids, without using an emulsifier, and by optionally drying of the aqueous polymer dispersion obtained thereby.

20 Claims, No Drawings

USE OF VINYLAROMATIC/1,3-DIENE COPOLYMERS STABILIZED WITH PROTECTIVE COLLOIDS IN BUILDING ADHESIVE FORMULATIONS

The invention relates to the use of vinylaromatic/1,3-diene copolymers stabilized with protective colloids and in the form of their aqueous polymer dispersions or water-redispersible polymer powders in building adhesive formulations, in particular those for tile adhesives and full thermal insulation adhesives.

Cement-based tile adhesives are currently prepared in large quantities and represent the standard. Using cement-based adhesives it is possible to prepare waterproof and frost-proof adhesives which, by modification with different amounts of polymer, can be adapted to suit the necessary requirements in respect of adhesion and flexibility. The addition of a polymer achieves a significant improvement in processing reliability, which has allowed the triumphant progress of one-component dry mortars.

A precondition for the use of polymers for modification of dry mortars is their existence as water-redispersible powders. Tile adhesive compositions with redispersible polymer powders based on vinyl ester and acrylic acid ester polymers are known from EP-A 722917. The use of hydrophobic polymers based on vinylaromatic/1,3-diene copolymers is not described therein.

DE-A 2148456 (GB-A 1407827) recommends aqueous dispersions of styrene/1,3-butadiene copolymers, which contain silanol groups to improve the wet adhesion and have been prepared in an emulsion polymerization process in the presence of emulsifiers, for aqueous building adhesive compositions. Because of the emulsifier content, emulsifier-stabilized dispersions show a reduced bonding force, in particular after wet storage. Although the wet adhesion of the emulsifier-containing dispersions can be improved by copolymerization of alkoxyvinylsilanes, in many cases the copolymerization of such relatively expensive comonomers is not desirable.

EP-B 182628 relates to the use of aqueous emulsions of carboxyl-functional and silanol-functional styrene-butadiene copolymers containing zinc-ammonium complexes as tile adhesives. A disadvantage here is that adhesives with a sufficient resistance to water can be obtained only by copolymerization of alkoxyvinylsilanes and in the presence of complex salts.

WO-A 97/38042 and DE-A 19710380 discloses redispersible powders based on carboxylated styrene/butadiene copolymers which have been prepared in the presence of emulsifier and are sprayed with a special mixture of polyvinyl alcohol and the salt of an addition product of sulfosuccinate and maleic acid. As with all conventional emulsifier-stabilized powders, a disadvantage is that no redispersible powders are obtained without the copolymerization of carboxyl-functional monomers and without the use of special spraying aids.

It was thus the object to provide building adhesives based on aqueous dispersions and water-redispersible powders of vinylaromatic/1,3-diene copolymers which, in the case of the powders, are also redispersible without the copolymerization of functional comonomers, and have good adhesive properties when used as building adhesives without the use of special agents.

The invention relates to the use of aqueous polymer dispersions or water-redispersible polymer powders based on vinylaromatic/1,3-diene copolymers stabilized with protective colloids in building adhesive formulations, the polymer dispersions and the polymer powders being obtained by emulsion polymerization of a mixture comprising at least one vinylaromatic and at least one 1,3-diene in the presence of one or more protective colloids, with exclusion of any emulsifier, and if appropriate drying of the aqueous polymer dispersion obtained by this process.

Suitable vinylaromatics are styrene and methylstyrene, and styrene is preferably copolymerized. Examples of 1,3-dienes are 1,3-butadiene and isoprene, and 1,3-butadiene is preferred. The copolymers in general comprise 20 to 80% by weight, preferably 30 to 70% by weight, of vinylaromatic and 20 to 80% by weight, preferably 30 to 70% by weight, of 1,3-diene, and they can optionally also contain further monomers, and the data in % by weight in each case add up to 100% by weight.

Up to 30% by weight, based on the total weight of the monomer phase, of further monomers which can be copolymerized with vinylaromatics and 1,3-dienes, such as ethylene, vinyl chloride, (meth)acrylic acid esters of alcohols having 1 to 15 C atoms or vinyl esters of unbranched or branched carboxylic acids having 1 to 15 C atoms, can also optionally be copolymerized. 0.05 to 10% by weight, based on the total weight of the monomer mixture, of auxiliary monomers can optionally also be copolymerized. Examples of auxiliary monomers are ethylenically unsaturated mono- and dicarboxylic acids, preferably acrylic acid, methacrylic acid, fumaric acid and maleic acid; ethylenically unsaturated carboxylic acid amides and nitriles, preferably acrylamide and acrylonitrile; mono- and diesters of fumaric acid and maleic acid, such as the diethyl and diisopropyl ester, and maleic anhydride; and ethylenically unsaturated sulfonic acids and salts thereof, preferably vinylsulfonic acid and 2-acrylamido-2-methylpropanesulfonic acid. Further examples are pre-crosslinking comonomers, such as poly-ethylenically unsaturated comonomers, for example divinyl adipate, diallyl maleate, allyl methacrylate or triallyl cyanurate, or post-crosslinking comonomers, for example acrylamidoglycolic acid (AGA), methylacrylamidoglycolic acid methyl ester (MAGME), N-methylolacrylamide (NMA), N-methylolmethacrylamide, allyl N-methylcarbamate or alkyl ethers, such as the isobutoxy ether, or esters of N-methylolacrylamide, of N-methylolmethacrylamide and of allyl N-meth-ylolcarbamate. Epoxide-functional comonomers, such as glycidyl methacrylate and glycidyl acrylate, are also suitable. Further examples are silicon-functional comonomers, such as acryloxypropyltri(alkoxy)- and methacryloxypropyltri(alkoxy)silanes, vinyltrialkoxysilanes and vinylmethyldialkoxysilanes, which can contain as alkoxy groups, for example, ethoxy and ethoxypropylene glycol ether radicals. Monomers with hydroxyl or CO groups may also be mentioned, for example methacrylic acid and acrylic acid hydroxyalkyl esters, such as hydroxyethyl, hydroxypropyl or hydroxybutyl acrylate or methacrylate, and compounds such as diacetoneacrylamide and acetylacetoxyethyl acrylate or methacrylate.

The choice of monomers and the choice of the weight contents of the comonomers is made such that in general a glass transition temperature of Tg of −70° C. to +100° C., preferably −50° C. to +50° C., particularly preferably −20° C. to +40° C. results. The glass transition temperature Tg of the polymers can be determined in a known manner by means of differential scanning calorimetry (DSC.). The Tg can also be calculated beforehand by approximation by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ represents the weight fraction (% by weight/100) of the monomer n and $Tg_n$ is the glass transition temperature, in degrees Kelvin, of the homopolymer of monomer n. Tg values for homopolymers are listed in Polymer Handbook 2nd Edition, J. Wiley & Sons, New York (1975).

Suitable protective colloids are, for example, polyvinyl alcohols, polysaccharides in water-soluble form, such as starches (amylose and amylopectin), modified starches, such as starch ethers, for example hydroxyalkyl ether starches, dextrins and cyclodextrins, celluloses and carboxymethyl, methyl, hydroxyethyl and hydroxypropyl derivatives thereof, poly(meth)acrylic acid, poly(meth)acrylamide, melamine-formaldehyde sulfonates and naphthalene-formaldehyde sulfonates.

Polyvinyl alcohols having a degree of hydrolysis of 80 to 95 mol % and a Höppler viscosity in 4% strength aqueous solution of 1 to 30 mPas (Höppler method at 20° C., DIN 53015) are preferred. Hydrophobically modified polyvinyl alcohols with a degree of hydrolysis of 80 to 95 mol % and a Höppler viscosity in 4% strength aqueous solution of 1 to 30 mPas are also suitable. Examples of these are partly hydrolysed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C. atoms, dialkyl maleates and dialkyl fumarates, such as diisopropyl maleate and diisopropyl fumarate, vinyl chloride, vinyl alkyl ethers, such as vinyl butyl ether, and olefins, such as ethene and decene. The content of hydrophobic units is preferably 0.1 to 10% by weight, based on the total weight of the partly hydrolysed polyvinyl acetate, the hydro-phobically modified polyvinyl alcohols generating a surface tension of <40 mN/m in 2% strength aqueous solution. Mixtures of the polyvinyl alcohols mentioned can also be employed.

The partly hydrolysed polyvinyl acetates with vinyl alcohol units and units of vinyl esters of alpha-branched carboxylic acids having 5 or 9 to 11 C atoms in the amounts mentioned are particularly preferred. Examples of such vinyl esters are those which are available as versatic acid vinyl esters from Shell under the names VeoVa$^R$5, VeoVa$^R$9, VeoVa$^R$10 and VeoVa$^R$11. Further suitable polyvinyl alcohols are partly hydrolysed, hydrophobized polyvinyl acetates, which are obtained by polymer-analogous reaction, for example acetalization of the vinyl alcohol units with $C_1$- to $C_4$-aldehydes, such as butyraldehyde. The content of hydrophobic units is preferably 0.1 to 10% by weight, based on the total weight of the partly hydrolysed polyvinyl acetate. The degree of hydrolysis is 80 to 95 mol %, preferably 85 to 94 mol %, and the Höppler viscosity (DIN 53015, Höppler method, 4% strength aqueous solution) is 1 to 30 mPas, preferably 2 to 25 mPas.

Polyvinyl alcohols with a degree of hydrolysis of 85 to 94 mol % and a Höppler viscosity in 4% strength aqueous solution of 2 to 25 mPas (Höppler method at 20° C., DIN 53015) and combinations thereof with the hydrophobically modified polyvinyl esters mentioned in a weight ratio of 10/1 to 1/10 are most preferred. The protective colloids mentioned are accessible by means of processes known to the expert.

The polymer powders stabilized with protective colloids are prepared by the emulsion polymerization process, the polymerization temperature in general being 40° C. to 100° C., preferably 60° C. to 90° C. The copolymerization of gaseous comonomers, such as ethylene or vinyl chloride, can also be carried out under pressure, in general between 5 bar and 100 bar. The polymerization is initiated with the conventional initiators or redox initiator combinations for emulsion polymerization, for example hydroperoxides, such as tert-butyl hydroperoxide, azo compounds, such as azobisisobutyronitrile, and inorganic initiators, such as the sodium, potassium and ammonium salts of peroxodisulfuric acid. The initiators mentioned are in general employed in an amount of 0.05 to 3% by weight, based on the total weight of the monomers. Redox initiators which are used are combinations of the initiators mentioned in combination with reducing agents, such as sodium sulfite, sodium hydroxymethanesulfinate and ascorbic acid. The amount of reducing agent is preferably 0.01 to 5.0% by weight, based on the total weight of the monomers.

The polymerization mixture is stabilized by means of the protective colloids mentioned, without additional emulsifiers. Preferably, some of the protective colloid content is initially introduced here into the polymerization vessel, and some is metered in after initiation of the polymerization. Polymerization is in general carried out in the presence of 1 to 25% by weight of protective colloid, based on the total weight of the monomers. The monomers can be initially introduced into the polymerization vessel in total, metered in in total or initially introduced in portions, and the remainder can be metered in after the initiation of the polymerization. A suitable preparation process is described, for example, in PCT Application PCT/EP98/06102, the disclosure of which in this respect is intended to form part of this Application.

Surprisingly, it has been found that the building adhesive properties in respect of processability and adhesion thereof depends greatly on the degree of crosslinking of the 1,3-diene units in the vinylaromatic/1,3-diene copolymer. The degree of crosslinking can be controlled by means of polymerization regulators, for example by means of n-dodecylmercaptan, t-dodecylmercaptan, mercaptopropionic acid, mercaptopropionic acid methyl ester, isopropanol and acetaldehyde, which are in general metered in during the polymerization. The optimum which has been determined for the degree of crosslinking of the base polymers is the range from 60 to 80%, that is to say 60 to 80% by weight of the polymeric contents are insoluble in tetrahydrofuran. To establish the degree of crosslinking, the amount of regulator is chosen such that the desired degree of crosslinking is obtained, depending on the copolymer composition, that is to say the 1,3-diene content, and, depending on the polymerization conditions, specifically the poly-merization temperature. In general, 0.2 to 2.5% by weight of regulator, based on the amount of comonomer, is employed for this.

After conclusion of the polymerization, post-polymerization can be carried out using known methods, for example by post-polymerization initiated with a redox catalyst, for removal of residual monomers. Volatile residual monomers can also be removed by means of distillation, preferably under reduced pressure, and if appropriate by passing inert entraining gases, such as air, nitrogen or steam, through or over the mixture. The aqueous dispersions obtainable by this process in general comprise 1 to 25% by weight of protective colloid, based on the polymer content, and have a solids content of 30 to 75% by weight, preferably 40 to 65% by weight.

To prepare the water-redispersible polymer powders, the aqueous dispersions are dried, for example by means of fluidized-bed drying, freeze drying or spray drying. The dispersions are preferably spray-dried. Spray drying here is carried out in customary spray-drying units, it being possible for the atomization to take place by means of one-, two- or multi-component nozzles or with a rotating disc. The exit temperature is in general in the range from 55° C. to 100° C., preferably 70° C. to 90° C., depending on the unit, the Tg of the resin and the desired degree of drying.

The total amount of protective colloid before the drying operation should preferably be at least 10% by weight, based on the polymer content. To ensure redispersability, as a rule it is necessary to add further protective colloids as spraying aids to the dispersion before drying. The content of protective colloid before spraying of the dispersion is, as a rule, 5 to 25% by weight, based on the polymeric constituents of the dispersion.

Suitable spraying aids are partly hydrolysed polyvinyl acetates; polyvinylpyrrolidones; polysac-charides in water-soluble form, such as starches (amylose and amylopectins) and modified starches, such as starch ethers, for example hydroxyalkyl ether starches; celluloses and carboxymethyl, methyl, hydroxyethyl and hydroxypropyl derivatives thereof; proteins, such as casein or caseinate, soya protein and gelatin; lignin-sulfonates; synthetic polymers, such as poly(meth)acrylic acid, copolymers of (meth)acrylates with carboxyl-functional comonomer units, poly(meth)-acrylamide, polyvinylsulfonic acids and water-soluble copolymers thereof; and melamine-formaldehyde sulfonates, naphthalene-formaldehyde sulfonates and styrene/maleic acid and vinyl ether/maleic acid copolymers. Partly hydrolysed polyvinyl acetates with a degree of hydrolysis of 80 to 95 mol % and a Höppler viscosity of 1 to 30 mPas, which can optionally be modified hydrophobically as described above, are preferred as the spraying aids.

For the spraying, a content of up to 1.5% by weight of antifoam, based on the base polymer, has proved favourable in many cases. To improve the storage stability by improving the stability to blocking, in particular in the case of powders with a low glass transition temperature, an antiblocking agent (anticaking agent), preferably up to 30% by weight, based on the total weight of the polymeric constituents, can be added to the powder obtained. Examples of antiblocking agents are Ca carbonate and Mg carbonate, talc, gypsum, silicic acid and silicates with particle sizes preferably in the range from 10 nm to 10 $\mu$m.

To improve the use properties, further additives can be added during the spraying. Further constituents of dispersible powder compositions which are contained in preferred embodiments are, for example, pigments, fillers, foam stabilizers and hydrophobizing agents.

To prepare the building adhesive, the polymer dispersion or the polymer powder composition is mixed and homogenized with the other constituents of the formulation, such as cement, filler and further additives, in suitable mixers. If appropriate, the dispersible powder composition can also be added at the building site in the form of an aqueous redispersion (two-component adhesive). Preferably, a dry mixture is prepared and the water required for processing is added directly before processing. For the preparation of paste-like building adhesives, the water content is first initially introduced into the mixing vessel, the dispersion is added and the solids are finally stirred in.

The dispersions or powders are suitable for use in cement-containing building adhesive formulations. Typical formulations comprise 5 to 80% by weight of cement, 5 to 80% by weight of fillers, such as quartz sand, calcium carbonate or talc, 0.1 to 2% by weight of thickeners, such as cellulose ethers, laminar silicates or polyacrylates, 0.5 to 60% by weight of the vinylaromatic/1,3-diene copolymers stabilized with protective colloids and in the form of the polymer dispersion or polymer powder and, if appropriate, further additives to improve the stability, processability, open time and resistance to water. The data in % by weight here always relate to 100% by weight of dry mass of the formulation. The cement-containing building adhesive formulations mentioned are used above all as tile adhesives indoors and outdoors for laying tiles of all types (earthenware, stoneware, extra-fine stoneware, ceramic and natural tiles) and are also stirred with the corresponding amount of water before their use.

The vinylaromatic/1,3-diene copolymers stabilized with protective colloids are also suitable for use in cement-free building adhesive formulations, for example with the corresponding amount of gypsum as an inorganic binder in the abovementioned formulation. The cement-free building adhesive formulations are used above all as tile adhesives indoors for laying tiles of all types (earthenware, stoneware, extra-fine stoneware, ceramic, natural tiles) and as full thermal insulation adhesive for gluing polystyrene sheets to facades.

The aqueous dispersions of the vinylaromatic/1,3-diene copolymers stabilized with protective colloids are employed in particular in paste-like building adhesive formulations of the composition described above in respect of the inorganic binder, filler and thickener. Paste-like building adhesives are employed above all as tile adhesives and as full thermal insulation adhesives.

The following dispersible powders were tested for their suitability as building adhesives:

COMPARISON EXAMPLE 1

Dispersible powder based on a styrene/butyl acrylate copolymer polymerized in the presence of polyvinyl alcohol (degree of hydrolysis 88 mol %, Höppler viscosity 4 mPas) with a styrene content of 45% by weight and a butyl acrylate content of 55% by weight.

EXAMPLES 2 to 6

Dispersible powder based on a styrene/butadiene copolymer polymerized in the presence of polyvinyl alcohol (degree of hydrolysis 88 mol %, Höppler viscosity 4 mpas) with a styrene content of 65% by weight and a butadiene content of 35% by weight and the degrees of crosslinking stated in the table.

Use Testing
Determination of the Tube Settling

To determine the settling properties, in each case 50 g of the dispersible powder were redispersed in 50 ml of water and then diluted to a solids content of 0.5%, and the settling height of the solid of 100 ml of this redispersion was introduced into a graduated tube and the settling was measured after 1 hour and after 24 hours.

Determination of the Blocking Resistance

To determine the blocking resistance, the dispersible powder was introduced into an iron tube with a screw fitting and then loaded with a metal stamp. After the loading, the tube was kept in a drying cabinet at 50° C. for 16 hours. After cooling to room temperature, the powder was removed from the tube and the stability to blocking was determined qualitatively by crushing the powder. The stability to blocking was classified as follows:
1=Very good stability to blocking
2=Good stability to blocking
3=Satisfactory stability to blocking
4=Not stable to blocking, powder no longer free-flowing after crushing.

Determination of the Crosslinking

To determine a degree of crosslinking, a film was cast from the polymer dispersion obtained after the polymerization and the air-dried film was then heat-treated in a drying cabinet at 150° C. for 5 minutes. The heat-treated film was taken up in tetrahydrofuran (THF) and the mixture was then heated under reflux for 6 hours. After cooling, a portion of the clear solution was taken and, after removal of the solvent, the soluble content was determined. The content insoluble in THF was calculated from the amount weighed out and the soluble content.

To test the processability and the adhesive properties, the dispersible powders were processed in the following tile adhesive formulation. For this, the dry constituents were initially introduced into a mortar mixer, the water content was added and the mixture was then stirred.

| |
|---|
| 350 parts by weight of cement |
| 58 parts by weight of quartz sand No. 9a |
| 578 parts by weight of quartz sand No. 12 |
| 4 parts by weight of thickener (Walocel MKX 40000PF50) |
| 10 parts by weight of dispersible powder |
| 240 parts by weight of water |

Testing of the Processing Properties

The processing properties of the tile adhesives were evaluated directly after preparation thereof and one hour later. For this, the adhesive preparations were adjusted to a consistency which prevents a tile of 10×10 $cm^2$ slipping from a non-absorbent substrate (further tile). The ease of application of the adhesive, the increase in viscosity during the waiting time of one hour and the visual appearance (bubble formation) immediately after preparation and after one hour were evaluated. The evaluation was qualitative with a rating system from 1 to 6.

Determination of the Adhesive Strengths

To test the adhesive strength, the tile adhesives were applied to concrete slabs with a 5 mm toothed spatula. Thereafter, stoneware tiles of 5×5 $cm^2$ were laid and weighted with a 2 kg weight for 30 seconds. The tiles were then kept under the following conditions in accordance with DIN CEN 1897:

28T: 28 days standard climate (DIN 50014, 23° C., 50% atmospheric humidity).

7T/21N: 7 days standard climate and 21 days' wet storage in water (20° C.).

14T/14TS: 14 days standard climate, 14 days drying cabinet at 70° C., 1 day standard climate.

Frost-thaw: 7 days standard climate, 21 days' wet storage, 25 frost-thaw cycles (frost storage at at least −15° C., water storage at about 12° C.).

The adhesive strength was determined in accordance with DIN 18156 after storage using a pull-off apparatus from Herion with a load increase rate of 250 N/s. The measurement values in $N/mm^2$ are shown in Table 1 and represent means from 5 measurements.

The styrene/1,3-butadiene copolymers stabilized with protective colloids show outstanding redispersibility and resistance to blocking even without the copolymerization of functional comonomers. The mechanical strength of the bonds produced with them is outstanding, especially at a degree of crosslinking of 60 to 80%.

What is claimed is:

1. In a building adhesive formulation employing an aqueous polymer dispersion or a redispersible polymer powder prepared therefrom, the improvement comprising:
   employing as at least one aqueous polymer dispersion or redispersible polymer powder, an aqueous polymer dispersion obtained by emulsion polymerization of a mixture comprising at least one vinylaromatic and at least one 1,3-diene in the presence of one or more protective colloids, with exclusion of any emulsifier, or a dispersible polymer powder prepared from said aqueous polymer dispersion by drying said dispersion.

2. The building adhesive formulation of claim 1, wherein 20 to 80% by weight of styrene, as the vinylaromatic, and 20 to 80% by weight of 1,3-butadiene, as the 1,3-diene, are polymerized, optionally in the presence of further comonomers.

3. The building adhesive of claim 1, wherein one or more polyvinyl alcohols, starches, modified starches, dextrins, cyclodextrins, celluloses and carboxymethyl, methyl, hydroxyethyl and hydroxypropyl derivatives thereof, poly(meth)acrylic acid, poly(meth)acrylamide, melamine-formaldehyde sulfonates and naphthalene-formaldehyde sulfonates are employed as the protective colloids.

4. The building adhesive of claim 2, wherein one or more polyvinyl alcohols, starches, modified starches, dextrins, and cyclodextrins, celluloses and carboxymethyl, methyl, hydroxyethyl and hydroxypropyl derivatives thereof, poly(meth)acrylic acid, poly(meth)acrylamide, melamine-formaldehyde sulfonates and naphthalene-formaldehyde sulfonates are employed as the protective colloids.

5. The building adhesive of claim 1, wherein one or more polyvinyl alcohols with a degree of hydrolysis of 80 to 95 mol % and a Höppler viscosity of 1 to 30 mPa·s in 4% by weight aqueous solution, said polyvinyl alcohols selected from the group consisting of hydrophobically-modified polyvinyl alcohols and non-hydrophobically-modified polyvinyl alcohols, are employed as the protective colloid.

6. The building adhesive of claim 2, wherein one or more optionally hydrophobically modified polyvinyl alcohols with a degree of hydrolysis of 80 to 95 mol % and a Höppler viscosity of 1 to 30 mPa·s in 4% by weight aqueous solution are employed as the protective colloids.

7. The building adhesive of claim 3, wherein one or more optionally hydrophobically modified polyvinyl alcohols

TABLE 1

| Ex. | Tube settling (cm) 1 h/24 h | Blocking resist. | T g ° C. | Cross-linking [%] | Pro-cessing | 28 T $N/mm^2$ | 7T/21 N $N/mm^2$ | 14T/14TS +70° C. $N/mm^2$ | Frost-thaw $N/mm^2$ |
|---|---|---|---|---|---|---|---|---|---|
| Com. Ex. 1 | 0.4/0.9 | 2 | 7 | — | 3 | 1.15 | 0.78 | 0.31 | 0.61 |
| Ex.2 | 0.6/2.3 | 3 | 8 | 45 | 3 | 1.21 | 0.69 | 0.21 | 0.61 |
| Ex.3 | 0.4/1.3 | 2 | 10 | 63 | 2 | 1.23 | 0.79 | 0.32 | 0.86 |
| Ex.4 | 0.2/1.0 | 2 | 10 | 70 | 2 | 1.44 | 1.05 | 0.49 | 1.15 |
| Ex.5 | 0.4/0.7 | 2 | 9 | 78 | 3 | 1.32 | 1.03 | 0.41 | 1.12 |
| Ex.6 | 0.2/1.0 | 2 | 10 | 85 | 3 | 1.10 | 0.89 | 0.34 | 0.98 | with a degree of hydrolysis of 80 to 95 mol % and a Höppler viscosity of 1 to 30 mPa·s in 4% by weight aqueous solution are employed as the protective colloids.

8. The building adhesive of claim 4, wherein one or more optionally hydrophobically modified polyvinyl alcohols with a degree of hydrolysis of 80 to 95 mol % and a Höppler viscosity of 1 to 30 mPa·s in 4% by weight aqueous solution are employed as the protective colloids.

9. The building adhesive of claim 1, wherein the degree of crosslinking of the vinylaromatic/1,3-diene copolymers is 60 to 80%.

10. The building adhesive of claim 2, wherein the degree of crosslinking of the vinylaromatic/1,3-diene copolymers is 60 to 80%.

11. The building adhesive of claim 3, wherein the degree of crosslinking of the vinylaromatic/1,3-diene copolymers is 60 to 80%.

12. The building adhesive of claim 5, wherein the degree of crosslinking of the vinylaromatic/1,3-diene copolymers is 60 to 80%.

13. The building adhesive of claim 1, wherein the building adhesive formulation is used as a cement-containing or cement-free, optionally paste-like tile adhesive.

14. The building adhesive of claim 2, wherein the building adhesive formulation is a tile adhesive.

15. The building adhesive of claim 3, wherein the building adhesive formulation is a tile adhesive.

16. The building adhesive of claim 5, wherein the building adhesive formulation is a tile adhesive.

17. The building adhesive of claim 9, wherein the building adhesive formulation is a tile adhesive.

18. A thermal insulation adhesive comprising the building adhesive formulation of claim 1.

19. A thermal insulation adhesive comprising the building adhesive formulation of claim 2.

20. The tile adhesive of claim 13 which is a paste.

* * * * *

UNITED STATES PATENT AND TRADEMARK OFFICE
CERTIFICATE OF CORRECTION

PATENT NO. : 6,552,120 B1
DATED : April 22, 2003
INVENTOR(S) : Reinhard Härzschel et al.

It is certified that error appears in the above-identified patent and that said Letters Patent is hereby corrected as shown below:

<u>Column 10,</u>
Line 2, after "is" delete "used as".
Line 3, after "cement-free", delete "optionally paste-like".

Signed and Sealed this

Seventh Day of October, 2003

JAMES E. ROGAN
*Director of the United States Patent and Trademark Office*